US011330401B2

(12) United States Patent
Novlan et al.

(10) Patent No.: US 11,330,401 B2
(45) Date of Patent: May 10, 2022

(54) CENTRALLY ASSISTED ASSOCIATIONS WITH A LOCAL MANAGER BY PEERS IN A PEER TO PEER WIRELESS NETWORK

(71) Applicant: AT&T Intellectual Property I, L.P., Atlanta, GA (US)

(72) Inventors: Thomas Novlan, Cedar Park, TX (US); Ralf Bendlin, Cedar Park, TX (US); Arunabha Ghosh, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 318 days.

(21) Appl. No.: 16/268,848

(22) Filed: Feb. 6, 2019

(65) Prior Publication Data
US 2020/0252755 A1 Aug. 6, 2020

(51) Int. Cl.
H04W 4/06 (2009.01)
H04W 4/70 (2018.01)
H04W 72/02 (2009.01)
H04W 4/40 (2018.01)

(52) U.S. Cl.
CPC .............. *H04W 4/06* (2013.01); *H04W 4/40* (2018.02); *H04W 4/70* (2018.02); *H04W 72/02* (2013.01)

(58) Field of Classification Search
None
See application file for complete search history.

(56) References Cited

U.S. PATENT DOCUMENTS

| 5,696,903 A | 12/1997 | Mahany |
| 7,911,962 B2 | 3/2011 | Khuu et al. |
| 8,086,177 B2 | 12/2011 | Trift et al. |

(Continued)

FOREIGN PATENT DOCUMENTS

| WO | 2017118900 A1 | 7/2017 |
| WO | 2017133467 A1 | 8/2017 |

(Continued)

OTHER PUBLICATIONS

Falkenberg, Robert, et al. "Machine Learning Based Uplink Transmission Power Prediction for LTE and Upcoming 5G Networks using Passive Downlink Indicators." 2018 IEEE 88th IEEE Vehicular Technology Conference (VTC—Fall). 7 pages. https://arxiv.org/pdf/1806.06620.pdf.

(Continued)

*Primary Examiner* — Steve R Young
(74) *Attorney, Agent, or Firm* — Amin, Turocy & Watson, LLP

(57) ABSTRACT

The technologies described herein are generally directed toward facilitating centrally assisted associations with a local manager by peers in a peer to peer wireless system. According to an embodiment, a system can comprise a processor and a memory that can store executable instructions that, when executed by the processor, facilitate performance of operations. The operations can include identifying a group of local managers of a group of user equipments. The operations can further include receiving, from a network device, a criterion for selecting a local manager from the group of local managers of the group of user equipments, wherein the criterion is based on an association parameter selected by the network device.

20 Claims, 10 Drawing Sheets

(56) References Cited

U.S. PATENT DOCUMENTS

| | | | |
|---|---|---|---|
| 8,665,816 B2 | 3/2014 | Suzuki et al. | |
| 9,451,451 B2 | 9/2016 | Chow et al. | |
| 9,775,562 B2 | 10/2017 | Egner et al. | |
| 9,860,709 B2 | 1/2018 | Addepalli et al. | |
| 9,967,783 B2* | 5/2018 | Yu | H04W 36/0058 |
| 9,992,701 B2 | 6/2018 | Egner et al. | |
| 10,897,792 B2* | 1/2021 | Chen | H04W 4/40 |
| 2003/0202468 A1* | 10/2003 | Cain | H04L 45/302 |
| | | | 370/229 |
| 2010/0284388 A1* | 11/2010 | Fantini | H04W 48/18 |
| | | | 370/338 |
| 2014/0286178 A1* | 9/2014 | Roy | H04B 7/2643 |
| | | | 370/252 |
| 2015/0169024 A1 | 6/2015 | Jammer | |
| 2015/0223143 A1* | 8/2015 | Celebi | H04W 24/02 |
| | | | 455/446 |
| 2016/0345343 A1* | 11/2016 | Elsherif | H04W 72/1289 |
| 2017/0155703 A1* | 6/2017 | Hao | H04L 67/12 |
| 2018/0049014 A1 | 2/2018 | Patil et al. | |
| 2018/0184436 A1* | 6/2018 | Ohtsuji | H04B 7/2606 |
| 2018/0368191 A1 | 12/2018 | Vutukuri et al. | |
| 2018/0376304 A1 | 12/2018 | Cheng et al. | |
| 2019/0096265 A1* | 3/2019 | Mok | G08G 1/163 |
| 2019/0364492 A1* | 11/2019 | Azizi | H04W 48/16 |
| 2020/0092685 A1* | 3/2020 | Fehrenbach | H04B 7/2606 |

FOREIGN PATENT DOCUMENTS

| | | |
|---|---|---|
| WO | 2017189035 A1 | 11/2017 |
| WO | 2018031458 A1 | 2/2018 |
| WO | 2018081894 A1 | 5/2018 |
| WO | 2018166607 A1 | 9/2018 |
| WO | 2018168169 A1 | 9/2018 |
| WO | 2018182708 A1 | 10/2018 |
| WO | 2018182732 A1 | 10/2018 |
| WO | 2018202798 A1 | 11/2018 |
| WO | 2018211488 A1 | 11/2018 |

OTHER PUBLICATIONS

"IEEE COMSOC MMTC E-Letter." Multimedia Communications Technical Committee IEEE Communications Society. vol. 9, No. 5, Sep. 2014. 59 pages.

Baldessari, Roberto, et al. "Flexible Connectivity Management in Vehicular Communication Networks." Proceedings of 3rd International Workshop on Intelligent Transportation(WIT), pp. 211-216, Mar. 2006, Hamburg, Germany. 6 pages. http://citeseerx.ist.psu.edu/view doc/download?doi=10.1.1.453.9642&rep=rep1&type=pdf.

Alshaer, Hamada, et al. "A QoS Architecture for Provisioning High Quality in Intelligent Transportation Services." Network Operations and Management Symposium (NOMS), IEEE. 2012. 4 pages. https://www.researchgate.net/profile/Arnaud_De_La_Fortelle/publication/254036279_A_QoS_architecture_for_provisioning_high_quality_in_intelligent_transportation_services/links/58ac1635aca27206d9bf910f/A-QoS-architecture-forprovisioning- (See below for missing information).

Abanto-Leon, Luis. F., et al. "Enhanced C-V2X Mode-4 Subchannel Selection." arXiv preprint arXiv:1807.04819. Jul. 12, 2018 12 pages.

Patil, Prithviraj, et al. "Voronoi-based Placement of Road-side Units to Improve Dynamic Resource Management in Vehicular Ad Hoc Networks" Collaboration Technologies and Systems (CTS), 2013 International Conference, IEEE, 2013. 8 pages. https://www.researchgate.net/profile/Prithviraj_Patil2/publication/261244636_Voronoi-based_placement_of_roadside_units_to_improve_dynamic_resource_management_in_Vehicular_Ad_Hoc_Networks/ (See below for missing information).

Sepulcre, Miguel, et al. "Context-Aware Heterogeneous V2I Communications." Reliable Networks Design and Modeling (RNDM), 2015 7th International Workshop, IEEE, 2015. 6 pages. https://www.researchgate.net/profile/Miguel_Sepulcre/publication/308871899_Contextaware_heterogeneous_V2I_communications/links/5841399b08ae61f75dd0aac6.pdf.

* cited by examiner

CENTRALLY ASSISTED ASSOCIATIONS WITH A LOCAL MANAGER BY PEERS IN A PEER TO PEER WIRELESS NETWORK

TECHNICAL FIELD

The subject application is related to wireless communication systems, and, for example, the selecting of associations by user equipments (UEs) in a peer to peer wireless network.

BACKGROUND

Currently, in some peer to peer wireless networks, UEs select local managers based on a limited, local criteria that only provides information about the signal strength of potential local managers.

In certain circumstances, the conventional approaches can be advantageous because their simplicity can reduce the workload of UEs. In other circumstances however, the lack of centralized control, dynamic updates, and limited metrics analyzed can lead to sub-optimal selection of local managers by UEs.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
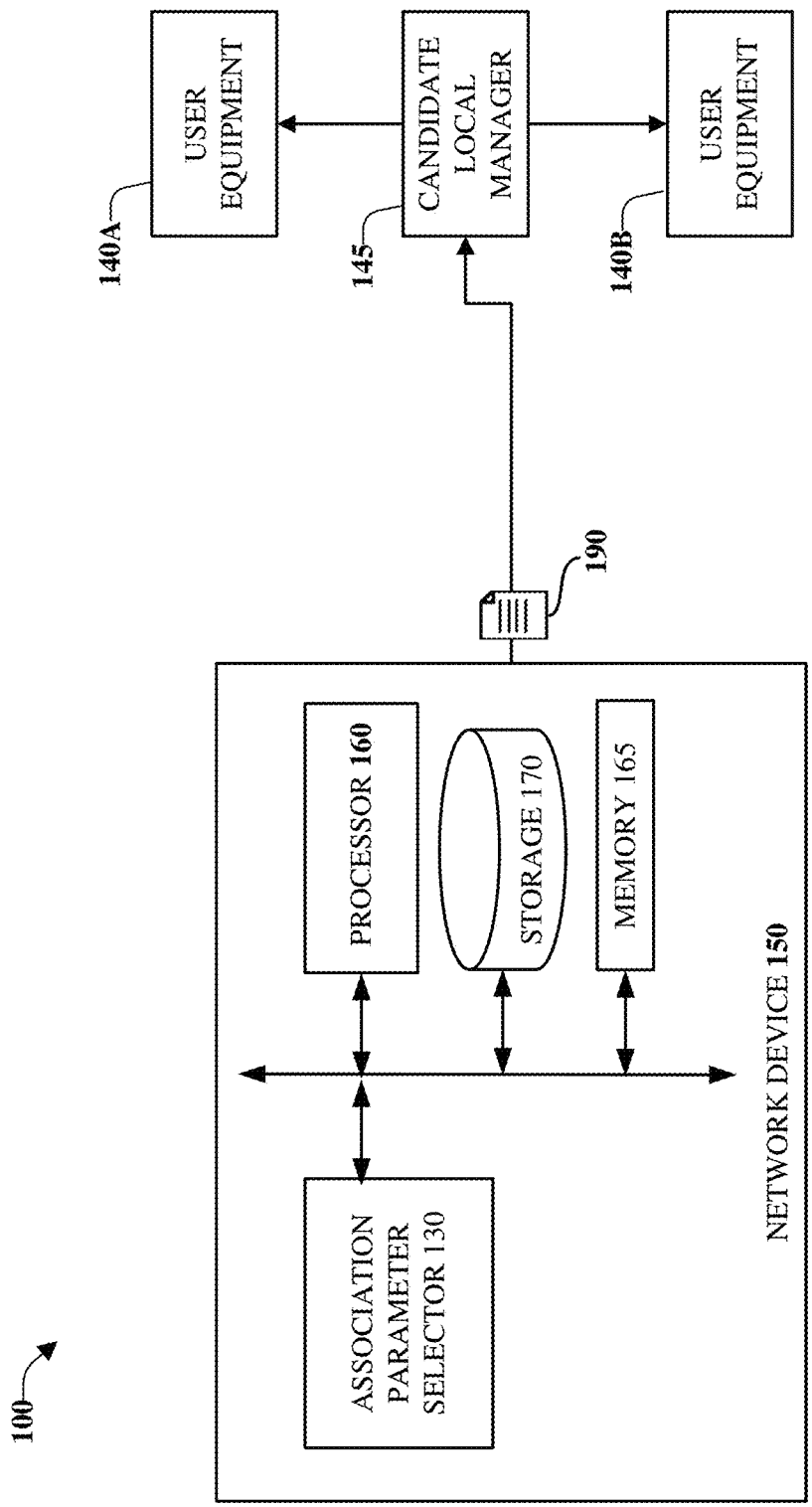
FIG. 1 illustrates a block diagram of an example, non-limiting system that includes a network device, a candidate local manager, and UEs, and can enable selection of a candidate local manager based on an association parameter, in accordance with one or more embodiments described herein.

Generally speaking, one or more embodiments described herein provide mechanisms and signaling to facilitate centrally assisted associations with a local manager by peers in a peer to peer wireless system.

In addition, one or more embodiments described herein can be directed towards a multi-connectivity framework that supports the operation of New Radio (NR, sometimes referred to as 5G). As will be understood, one or more embodiments can allow an integration of V2X UEs with network assistance, by supporting control and mobility functionality on cellular links (e.g. LTE or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

FIG. 1 illustrates a block diagram of an example, non-limiting system 100 that includes network device 150, candidate local manager 145, and UEs 140A-B and can enable selection of a candidate local manager 145 based on an association parameter 190, in accordance with one or more embodiments described herein.

According to multiple embodiments, network device 150 includes memory 165 that can store one or more computer and/or machine readable, writable, and/or executable components and/or instructions that, when executed by processor 160, can facilitate performance of operations defined by the executable component(s) and/or instruction(s). For example, memory 165 can store computer and/or machine readable, writable, and/or executable components and/or instructions that, when executed by processor 160, can facilitate execution of the various functions described herein relating to network device 150, including selecting, by association parameter selector 130, association parameter 190 that can provide a criterion for associating UEs 140A-B into groups, and communicating to UEs 140A-B, the criterion, that can enable UEs 140A-B to select candidate local manager 145 from a group of candidate local managers (not shown) based on the criterion.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
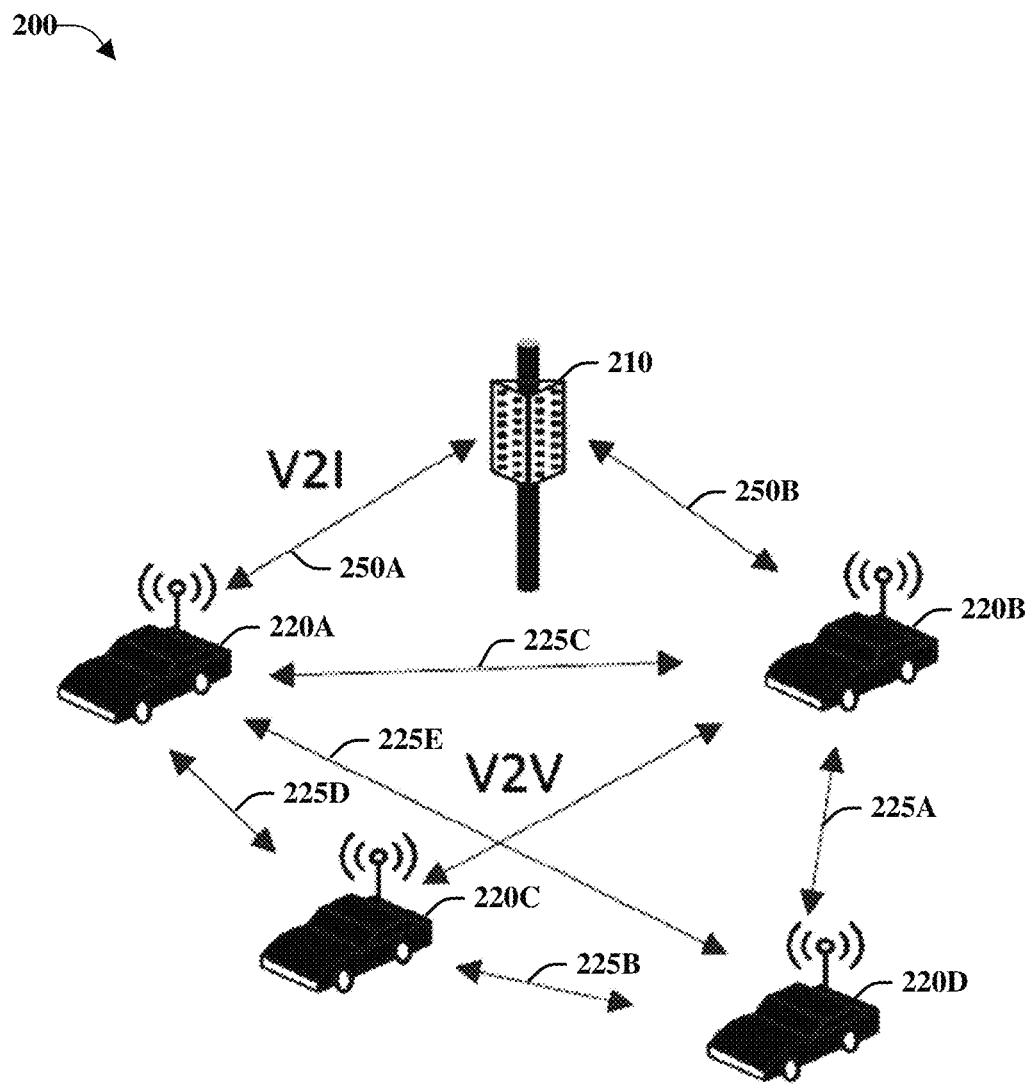
FIG. 2 illustrates an example wireless communication system showing an example peer to peer network with connections between UEs and connections to network device, in accordance with one or more embodiments.

FIG. 2 illustrates an example wireless communication system 200 showing an example peer to peer network with connections 225A-E between UEs 220A-D and connections 250A-B to network device 210, in accordance with one or more embodiments. For purposes of brevity, description of like elements and/or processes employed in other embodiments is omitted.

It should be noted that, on FIGS. 2-6, UEs are represented by vehicle icons, and network devices are represented by base station icons, but these icons are not intended to be limiting of the types of UEs and network devices that can be used with the embodiments discussed herein. Detailed examples of different types of UEs 220A-D that can be used with embodiments are described with FIG. 9 below, and detailed examples of different types of computer-enabled devices (e.g., network device 210) that can be used with embodiments are described with FIG. 10 below. For purposes of brevity, description of like elements and/or processes employed in other embodiments is omitted.

In an example implementation of one or more embodiments, FIG. 2 depicts V2X wireless services that comprise vehicle-to-infrastructure (V2I) connections 250A-B between UEs 220A-B (e.g., vehicles) and network device 210 that can be, but is not limited to, a next-generation node b device, a roadside access point unit, and a base station. The V2X wireless services also depict vehicle-to-vehicle (V2V) connections 225A-E (e.g., peer to peer) that can be established over the existing cellular (Uu) interface, or direct communication between UEs (e.g., device to device (D2D) or PC5) that does not use the cellular interface, e.g., a sidelink interface.

The association of the UEs with a local manager can be provided directly by the local manager through or centrally determined and configured by the network, e.g., from network device 210. In one or more embodiments, a local manager of a group of UEs is a UE member of the group that performs additional, group management functions, including assisting with discovery of UEs and network devices, allocating resources (e.g., frequencies and times available), scheduling of events (e.g., resource allocation updates), and link adaptation feedback (e.g., dynamically adjusting communication parameters based on changing channel conditions).

Another approach to associating UEs to a local manager can have UEs select a local device from available devices. In one or more examples discussed below, two of the UEs (e.g., UEs 220A-B) are specified as candidates to be a local manager (e.g., candidate local manager 145) of one or more of UEs within communication range, e.g., UEs 220C-D.

One approach that can be used by one or more embodiments can have network device 210 select two or more UEs as candidate local managers UEs 220A-B, e.g., selected based on factors that can include, but are not limited to, UE capabilities, geographical location of UE, and strength of connection to the UE. In other embodiments, candidate local managers UEs 220A-B can be selected by other approaches, including but not limited to selection by other local managers and self-selection. Once the candidate local managers UEs 220A-B are selected, UEs 220C-D that are either members of an existing group (e.g., with a local manager not shown) or are not members of a group, can receive information from the candidate local managers to enable selection of one with which to form an association.

As discussed further below, the information received by UEs 220C-D from candidate local managers UEs 220A-B can be analyzed by the UEs to determine which, if any, candidate local manager UE 220A or UE 220B is selected. In an example where both UEs 220C-D select candidate local manager UE 220B as a local manager, UEs 220B-D can be formed into a group of UEs managed by local manager UE 220B.

Figure 3:
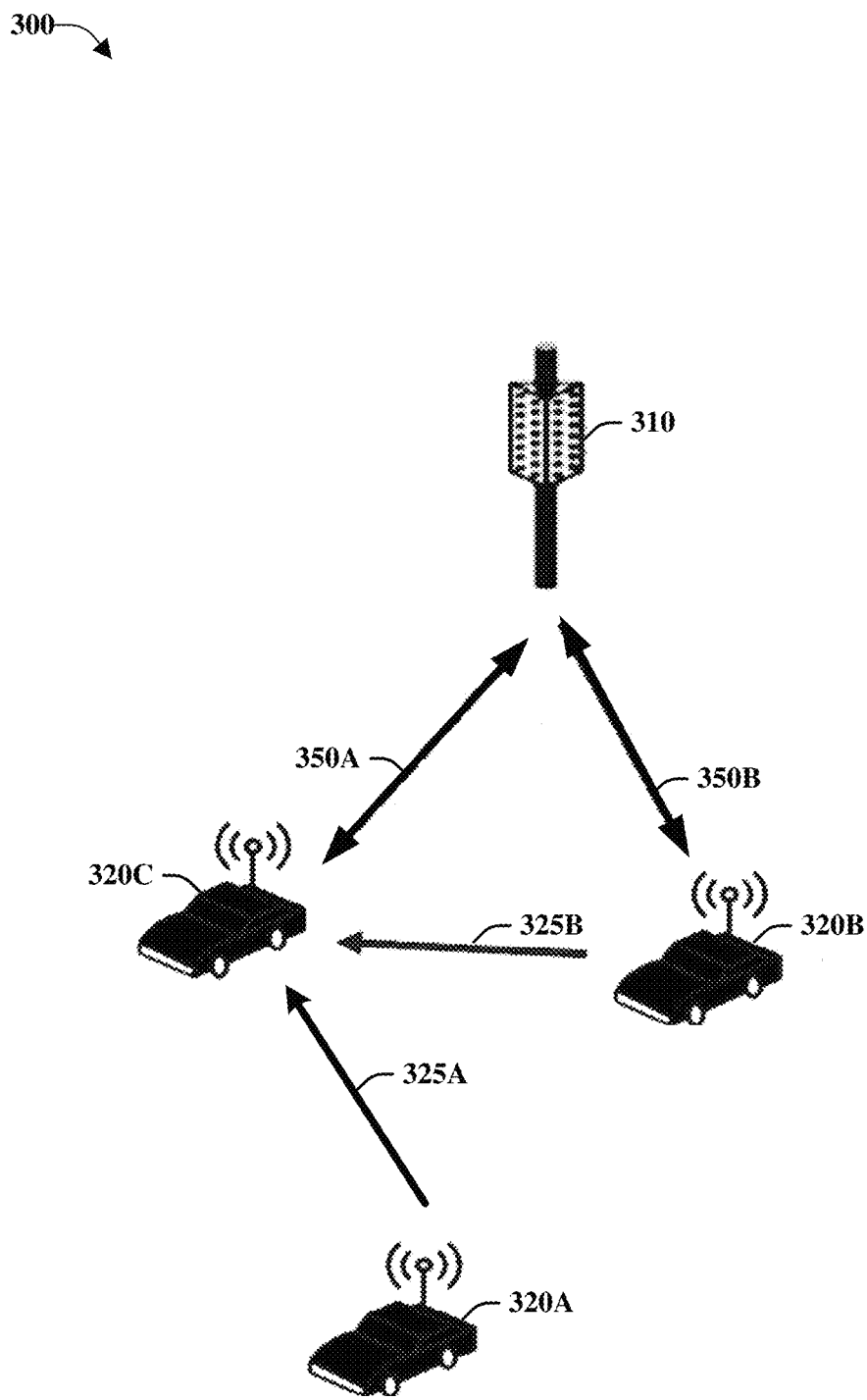
FIG. 3 illustrates an example wireless communication system showing an example peer to peer network with a network device, candidate local manager, according to one or more embodiments.

FIG. 3 illustrates an example wireless communication system 300 showing an example peer to peer network with a network device 310, candidate local manager UEs 320A-B, and UE 350C, according to one or more embodiments. As described above, UE 350C can receive information 325A-B from candidate local manager UEs 320A-B respectively.

One type of information that can be received by UEs 220C-D from candidate local managers UEs 220A-B is the reference signal received power (RSRP) of the respective local manages, e.g., the power of reference signals from a candidate local manager spread over full bandwidth and narrowband channels. An approach that can be used by UEs 220C-D is to select the candidate local manager with the highest RSRP. In some circumstances, this can provide an advantageous result, because of high received power from a candidate local manager. In other circumstances, selecting only based on this criterion can be less advantageous than a different approach, e.g., selecting based on a broad variety of factors, including throughput and bandwidth that can be provided by a local manager.

Figure 7:
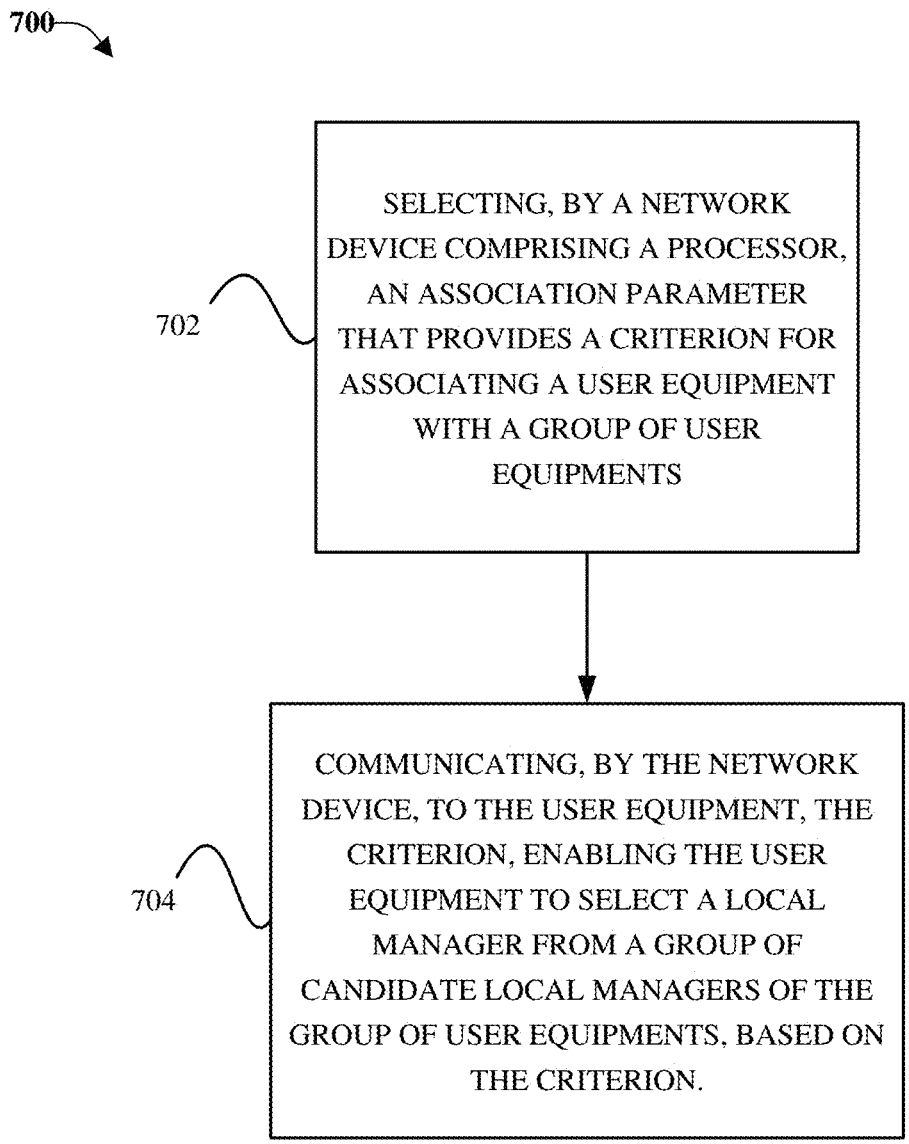
FIG. 7 illustrates a flow diagram of an example method that can facilitate centrally assisted associations with a local manager by peers in a peer to peer wireless system, in accordance with one or more embodiments.
Figure 8:
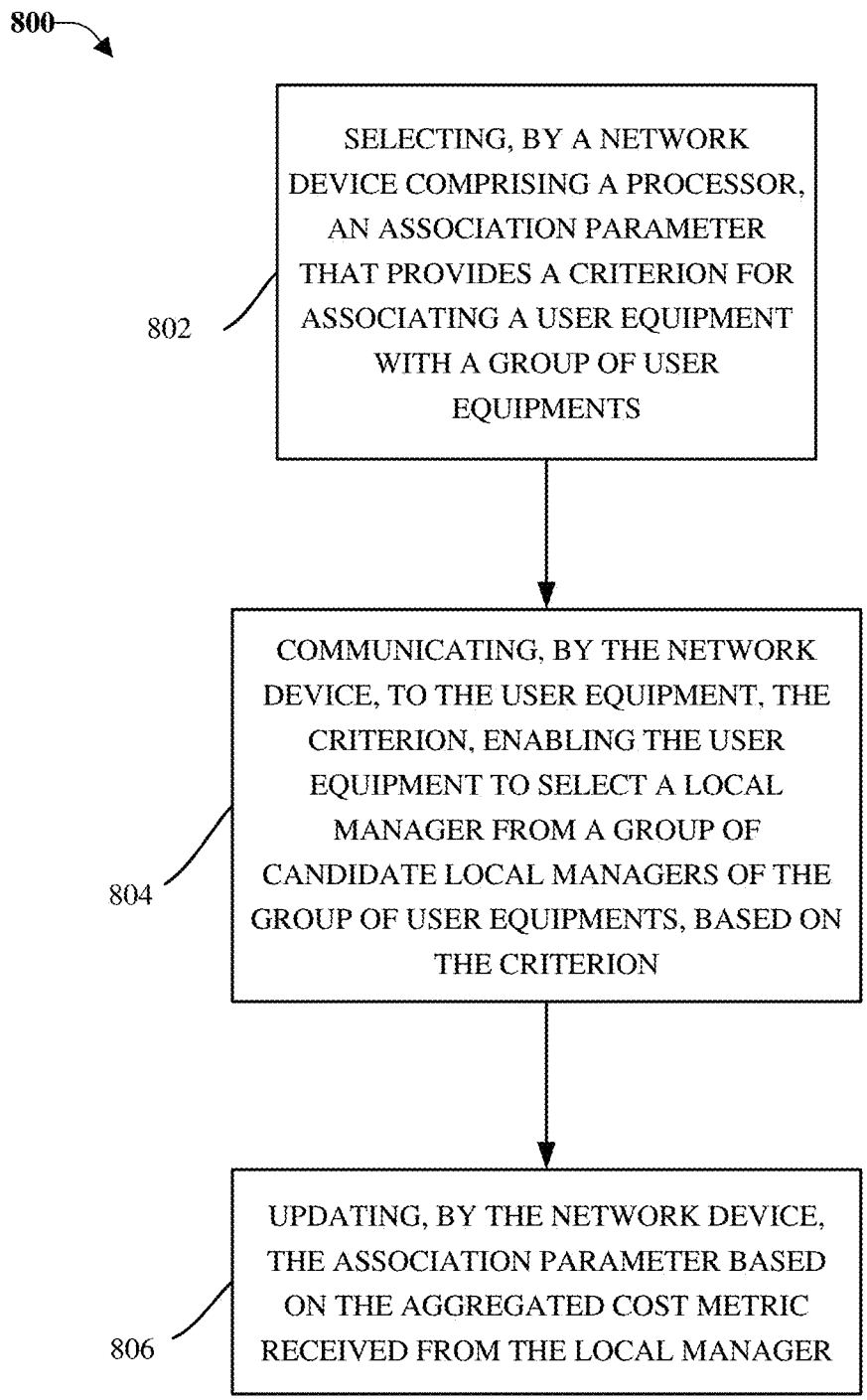
FIG. 8 illustrates a flow diagram of an example method that can facilitate providing feedback to improve the centrally assisted associations of FIG. 7. For purposes of brevity, description of like elements and/or processes employed in other embodiments is omitted.

One or more embodiments discussed with FIGS. 4-8 below provide alternative approaches and criteria that can be used by UEs to select from candidate local managers UEs 220A-B. Generally speaking, with FIG. 4, example approaches are described where a UE can receive a selected combination of factors from the local manager and can evaluate the factors to select a local manager. With the description of FIG. 5, alternate embodiments are described where a local manager can determine an association cost metric (ACM) based on different approaches and criterial, and this ACM can be used by UEs 220C-D to compare local managers, e.g., a local manager with the highest ACM can be selected. With FIG. 6, one or more embodiments are described that can notify a UE that new association criteria are available. FIGS. 7 and 8 provide example methods that can implement one or more of the embodiments described herein.

Figure 4:
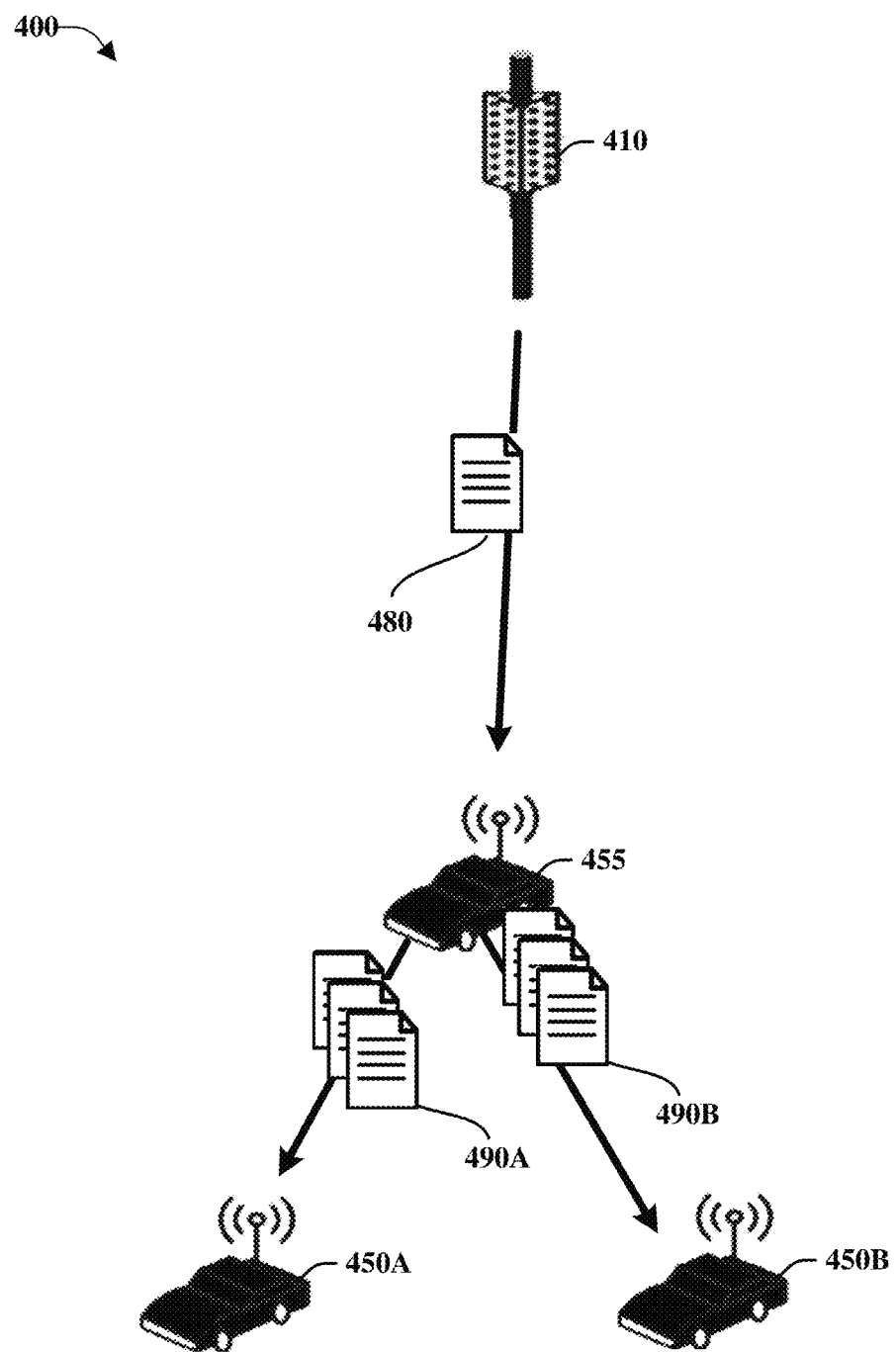
FIG. 4 illustrates an example wireless communication system showing an example peer to peer network with connections between UEs and connections to a network device, with a local manager that can be selected by UEs based on network metrics received from the local manager, in accordance with one or more embodiments.

FIG. 4 illustrates an example wireless communication system showing an example peer to peer network 400 with connections between UEs 450A-B and connections to network device 410, with local manager 455 that can be selected by UEs 450A-B based on network metrics received from local manager 455, in accordance with one or more embodiments. For purposes of brevity, description of like elements and/or processes employed in other embodiments is omitted.

In one or more embodiments, UEs 450A-B can be devices evaluating local manager 455, for example, these devices can be currently in a group managed by local manager 455 and the devices can be evaluating a candidate local manager member of the group (not shown) in preparation for a switch to another local manager, if needed. In a variation of this example, one or both of UEs 450A-B can be not currently members of a group, and these devices are evaluating local manager 455 in preparation to join the group by associating with local manager 455.

As described above, one approach that can be used by one or more embodiments, UEs 450A-B can receive information 490A-B respectively, and base a selection upon this received information. To perform a selection, one approach that can be employed by UEs 450A-B is to receive information 490A-B, this information being a combination of relevant factors collected or generated from one or more sources. In one example, some of the factors received are collected and/or generated by local manager 455, these factors including, available resources managed by local manager 455, supported maximum throughput for broadcast/groupcast/unicast traffic over sidelink in the group managed by local manager 455, group sidelink spectral efficiency, and the number of already associated UEs in the group. These factors can enable improved selection results in some circumstances because of the inclusion of information about the available capacity of the local manager, current performance of the group, and size of the group.

In one or more embodiments described herein, network device 410 can provide varying degrees of assistance in the composition of approaches used by UEs in the selection of local managers. One having skill in the relevant arts, given the description herein, would appreciate that network device 410 can have access to useful information in this regard, including, but not limited to aggregated network information, analysis of historical results, and coordinated strategies that can improve the performance of different approaches.

One way network device 410 can provide assistance with local manager selection by UEs is to provide association parameter 480 that can, for example, specify the composition of the information 490A-B provided by local manager 455 to UEs 450A-B. For example, based on analysis of the usage of multiple peer to peer networks in an area, network device 410 determines that analysis, by UEs of certain factors, can provide improved results, e.g., the number of already associated UEs in the group. It should be noted that, in this example, the factor to be provided is determined by local manager 455 (e.g., having the number of associated UEs available), but it was directed to be provided to UEs for analysis and selection by network device 410.

In an alternative implementation of this approach, instead of selection by network device 410, local manager 455 can select the composition of the factors to be provided to UEs, e.g., based on factors associated with the local group. In one or more embodiments, this approach, by having a local composition of factors can have an improved speed of update based on group conditions, but also be less comprehensive than the network device 410 selection approach, e.g., local manager can have less access to conditions of other groups than network device 410.

It should be noted that, in the embodiments described above, although UEs can receive a broad collection of selected network metrics, the analysis of these network metrics is based on an approach determined by individual UEs. In one or more embodiments, this approach can be determined based on considerations that include, but are not limited to, a standardized approach to utilizing information received.

In alternative embodiments, in the information provided by local manager 455 can specify the analysis approach to be used by UEs to evaluate the network metrics provided. In different embodiments, similar to the composition of factors provided, the analysis approach to provide can be selected by one or more of local manager 455 or network device 150, based on considerations detailed above with respect to the composition of parameters, e.g., broad network metrics available to network device 410 and group-level network metrics available to local manager 455. In one implementation, association parameter 480 can include the network metrics to be communicated by local manager 455 for analysis by UEs 450A-B or the analysis approach to be used by UEs 450A-B to analyze the network metrics.

To illustrate this concept, returning to an example discussed above, in circumstances where network device 410 determines that the number of already associated UEs in a group is a significant factor, network device can specify, in association parameter 480, that this factor be provided to UEs by local manager 455 and an approach to be used by UEs that emphasizes this factor.

In one or more embodiments, the approach of having UEs perform analysis on received factors described above can have advantages in certain circumstances, e.g., performing analysis by UEs can reduce a workload on one or both of local manager 455 and network device 410. In other circumstances, providing a selected combination of factors and/or an approach designed to improve selection to UEs can expose proprietary optimization information.

In contrast to the above approaches, one or more embodiments described with FIG. 5 below can provide UEs with a determined ACM for each local manager to be considered that can be used by UEs to the compare local managers.

Figure 5:
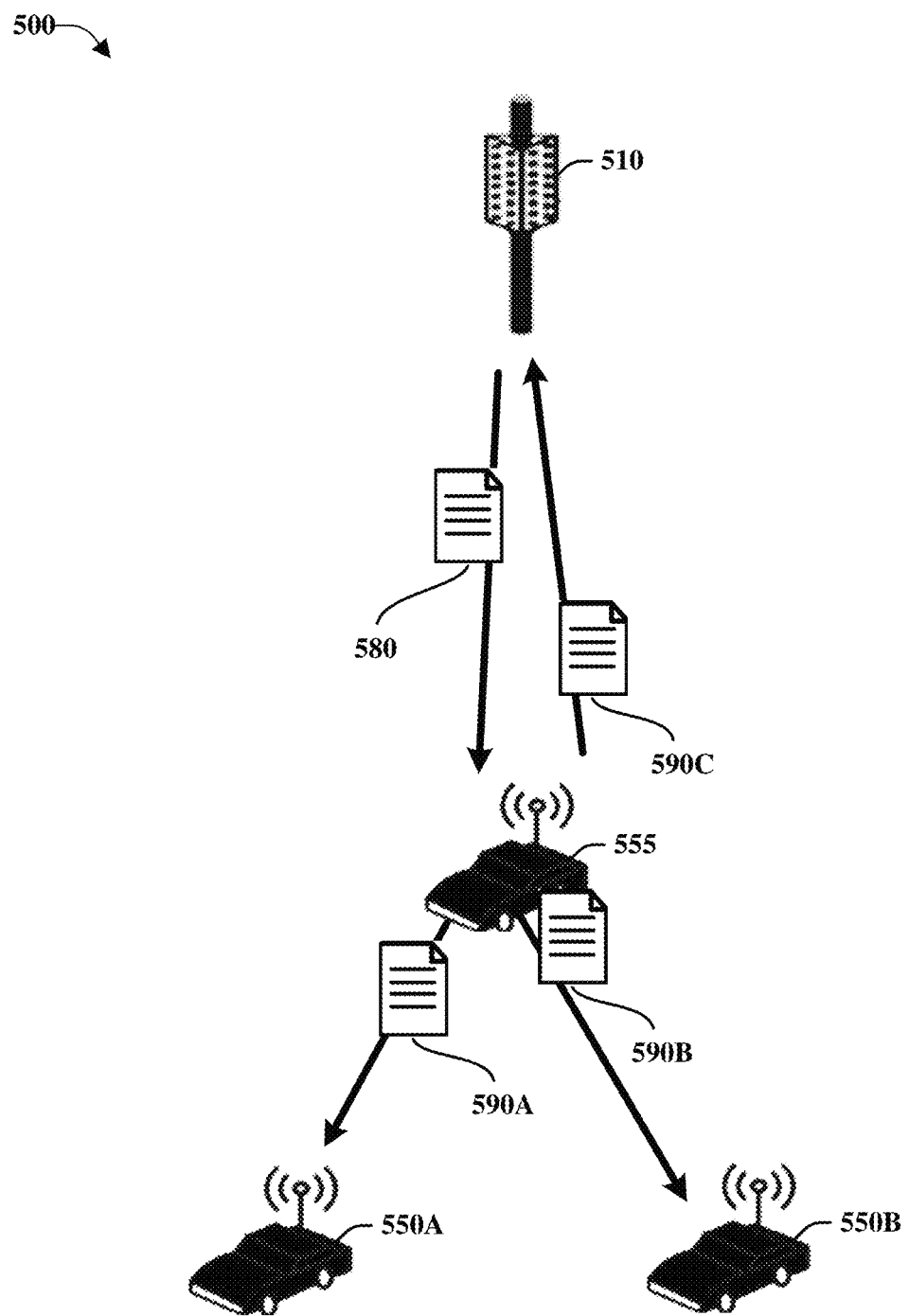
FIG. 5 illustrates an example wireless communication system showing an example peer to peer network with connections between UEs and connections to network device, with a local manager that can be selected by UEs based on an associated cost metric (ACM) received from the local manager, in accordance with one or more embodiments.

FIG. 5 illustrates an example wireless communication system showing an example peer to peer network 500 with connections between UEs 550A-B and connections to network device 510, with local manager 555 that can be selected by UEs 550A-B based on an associated cost metric (ACM) 590A-B received from local manager 555, in accordance with one or more embodiments. For purposes of brevity, description of like elements and/or processes employed in other embodiments is omitted.

In one or more embodiments, factors, discussed above, that can be communicated to a UE to enable analysis and selection of a local manager, can be aggregated, and processed to produce an association cost metrics (ACMs) 590A-B. In one or more embodiments criteria 590A-B can be determined by local manager 555 based on network metrics that include, but are not limited to, local manager operation metrics, available resources, supported maximum throughput for broadcast/groupcast/unicast traffic over sidelink in the group managed by local manager 455, group sidelink spectral efficiency, the number of already associated UEs in the group, a supportable sidelink data rate (SSDR) corresponding to the resources that can be shared within the group, and RSRP. One having skill in the relevant arts, given the description herein would appreciate additional features that can be used by one or more embodiments to determine an ACM.

In additional embodiments, network device 510 can provide association parameters 580 to the process in several ways, including but not limited to, providing broader network metrics (e.g., metrics based on information from other groups or historical data) for use in determining the ACM by local manager 555, and a specification of the approach to be used by local manager 555 to determine the ACM. Another way that network device 510 can affect the determination of the ACM is by providing association parameters that include weights and thresholds for the network metrics upon which the ACM is based, e.g., considering a network metric weighted against another metric, and applying a minimum threshold for a network metric to be considered for the ACM.

In an example determination of an ACM for local manager 555, network device 510 can determine, based on, for example, analysis of several geographically proximate peer to peer groups, that two network metrics are of significance in the selection of local manager 555 by UEs 550A-B. Example network metrics can be significant include the RSRP of local manager 555, and the SSDR of the group of which local manager 555 manages. One way this example ACM (e.g., criteria 590A-B) can be determined is:

$$ACM = a'*RSRP + b'*SSDR$$

In the ACM expression above, SSDR can be equal to an estimated spectral efficiency multiplied by number of resource blocks divided by a number of associated UEs, and RSRP can be the linear average of reference signal power (in Watts) across a specified bandwidth (in number of resource elements). In an example implementation, RSRP can be the most important network metric measured by a UE, for tasks including, but not limited to cell selection, cell reselection, and cell handover. The above example expression also includes weights (a' and b') to bias in favor of a network metric or to balance the network metrics, e.g., RSRP and SSDR, respectively.

Continuing the above example, in an association parameter, network device 510 can not only specify the analysis that the local manager can use to determine the ACM, but also provide weights for the component network metrics to use with the ACM (e.g., the ACM expression above), e.g., when RSRP weight a' equals two this can result in a RSRP having twice the significance of SSDR in the expression above. In other examples, when SSDR weight b' equals zero, this can negate the SSDR value and only RSRP is considered in the association, while when RSRP weight a' equals zero, this can negate the RSRP value and only SSDR is considered for determination of the ACM. In example circumstances, a high SSDR can indicate a local manager with a large number of available resources or a low number of already associated UEs.

In an example application of the above described ACM, as traffic load and user mobility change, one or more embodiments can enable the associations between UEs and local managers to adapt with these dynamics. For example, for a connection with a high RSRP and a low SSDR, an ACM can be comparatively lower than other circumstances, e.g., sub-optimal performance can result from associating with a local manager with a high RSRP, but also having a low SSDR, indicating a high contention for resources.

In one or more embodiments, the adaption of the associations for a group can be improved by enabling a local manager to autonomously select weights according to capabilities of the local manager's capability, e.g., enabling UEs to select between high performance local managers and low-complexity local managers. Weights for different ACM metrics can also be specified to a local manager 555 by network device 510 as a part of a local manager setup procedure.

In one or more embodiments, weights can have an associated validity period and when this period expires, a new set of available ACMs can be generated, or a set of default ACM values can be applied (which can also be used in case of operation out-of-network coverage scenarios).

In one or more embodiments, weight can be adapted based on factors including, but not limited to a traffic type (e.g., broadcast/groupcast/unicast), a user priority level, and supported quality of service level (QoS) for real-time sensor sharing as compared to local video distribution. For example, UEs broadcasting latency insensitive traffic can have one set of weights applied, while for UEs with critical or latency sensitive traffic, different weights can be applied, and these different weights can result in different user associations.

In an alternative embodiment that is similar to the approach described with FIG. 3 above, a part of the network metrics that can be used to determine an ACM can be communicated by the local manger to UEs (e.g. the weights from network device 510 and the SSDR determined by local manager 555) while the remainder of the values used to determine the ACM can be determined by the UE (e.g. the measured RSRP of the candidate local manager). In this example, the approach to determining the ACM can also be communicated to the UEs. In a third alternative, only the approach or functional expression for calculating the ACM is provided to the UE, while the network metrics that can be used in the determination of the ACM can be determined by the UE via measurement or other analysis.

In one or more embodiments, to improve the guidance available from network device 510, local manager 555 can periodically communicate determined criteria 590C values to network device 510, for analysis. In an example, when network device 510 relays guidance in the form of weighs, approaches to take for determining ACMs, and network metrics to be used to determine ACMs, periodically receiving an ACM based on the above guidance provides feedback that can improve future guidance from network device 510. In additional embodiments, local manager 555 can also provide a transmission summary to network device 510. Receiving determined ACM value can also determine whether local manager 555 is operating in an efficient mode, as well as predict a network traffic level in a certain area. Network device 510 can combine this feedback with other available network metrics, determine any adjustments to association parameters that can be needed. Receiving determined criteria 590C values from multiple local managers can also enable network device 510 to activate a different local manager, if necessary.

As noted above, ACM parameters and approaches used by UEs to select local managers can change at different intervals and for different reasons. The discussion above describes a variety of different network metrics and determination approaches used by one or more embodiments. It should be noted that changes in these, and other, relied upon factors can cause characteristic of the ACM determined by local manager 555, and other local managers to change. Different approaches to notifying UEs that a new ACM has been determined are discussed with FIG. 6 below.

Figure 6:
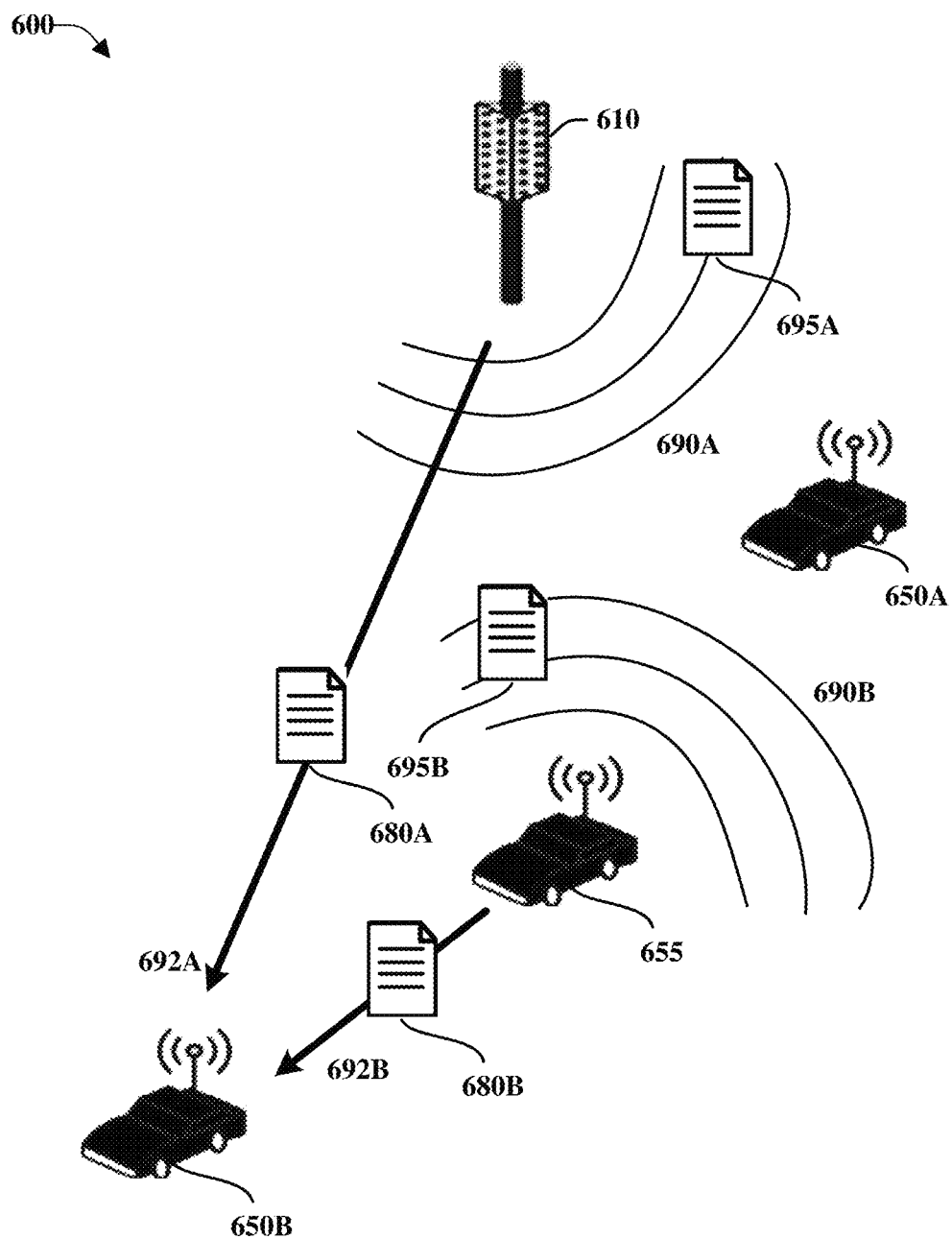
FIG. 6 illustrates an example wireless communication system showing an example peer to peer network with UEs associated with local manager in a peer to peer network, and part of a cellular network serviced by network device, in accordance with one or more embodiments.

FIG. 6 illustrates an example wireless communication system showing an example peer to peer network 600 with UEs 650A-B associated with local manager 655 in a peer to peer network, and part of a cellular network serviced by network device 610, in accordance with one or more embodiments. For purposes of brevity, description of like elements and/or processes employed in other embodiments is omitted.

In one or more embodiments, local manager 655 and UEs 650A-B can be connected to network device 610, e.g., by a cellular interface (not shown), and UEs 650A-B and local manager 655 can be connected in a peer to peer network, e.g., by a sidelink interface. In this example, UEs 650A-B can selectively associate with local manager 655, e.g., by one or more embodiments described above.

In the approaches described with FIG. 4 (e.g., UEs can associate with local manager 655 based selected network metrics), FIG. 5 (e.g., UEs receive ACM and can select local manager 655 based on the ACM), or a combination of the two approaches, can rely upon periodic updates to the selection criteria received from local manager 655 and/or network device 610. Example updates include, but are not limited to, weights of different network metrics, approaches used to combine and analyze metrics, and the ACM associated with local manager 655.

One or more embodiments have different approaches to communicating the above-noted information to UEs 650A-B. In one or more embodiments network device 610 can select an association parameter that can provides guidance (e.g., a criterion) for associating user equipment into groups, e.g., preferred network metrics, weights, entire approaches to be used to determine an ACM. In one or more embodiment, the association parameter can also be minor, e.g., an instruction for local manager 655 to provide information about UE association.

In one or more embodiments, the association parameter can be communicated to local manager 655, and, as described above, local manger 655 can communicate criteria for association to UEs 650A-B by performing actions that can include, but are not limited to, relaying the information unchanged to UEs 650A-B for use, providing to UEs 650A-B network metrics and approaches to be used for association, determining an ACM with or without guidance from the association parameter, or any combination of the above or similar approaches.

Because, in one or more embodiments, local manager generates the criteria based, in part, on the association parameter, network device 610 can be termed as communicating the criteria (e.g., by local manager 655) to UEs 650A-B for use.

One way that local manager 655 and network device can communicate criteria 695A-B to UE 650A is by broadcasted signals 690A-B respectively, e.g., a system information block (SIB) signal. Alternatively, a dedicated signaling approach using paging messages 692A-B can be used to communicate criteria 680A-B respectively, to UE 650B, e.g., a radio resource control (RRC) configuration signal. In this dedicated signal approach, the criterial 680A-B can be provided on demand to the UE, e.g., based on the use of specific random access procedure (RACH) preambles/resources and higher layer messages associated with either a two or four step RACH procedure.

As described in one or more embodiments above, periodic updates to criteria and other information can enable one or both of UEs 650A-B to advantageously associate with a different local manager (not shown) based on changing conditions. As described above, the information used to enable associations can have different update intervals, e.g., based on expiration times and other events. In one or more embodiments, broadcast criteria 695A-B communicated by broadcasted signals 690A-B can periodically read by UE 650A, e.g., at different intervals or based on network events detected by 650A, including changes in significant network metrics such as RSRP of local manager 655.

In an example, a dedicated field in broadcast criteria 695A-B can be incremented every time the local manager or network changes the criteria, and upon reading broadcast criteria 695A-B, UE 650A can read the dedicated field to check whether criteria have changed since it last decoded the broadcast channel. This flagging of changes in a broadcasted criteria 695A-B can, in some circumstances, advantageously reduce the workload on UE 650A, and improve the implementation of association changes.

Alternatively, instead of periodically decoding broadcast criteria 695A-B to read the dedicated field described above, local manager 655 and network device 610 can use paging messages 692A-B to notify UE 650B that broadcast information has changed. In one or more embodiments, example types of paging messages 692A-B that can used can include criteria 680A-B in short paging messages, e.g., messages comprising a control channel message with an indication that criteria have changed. That is, no dedicated data channel is used to convey the paging message rather, the control channel itself comprises the information that broadcast information has changed.

In an example paging message, cyclic redundancy check (CRC) bits of a control channel with which the paging message can be sent can be scrambled by a dedicated paging radio network temporary identifier (P-RNTI). For example, upon UE 650B receiving a control channel message with the CRC bits scrambled by said dedicated P-RNTI, the UE can determine that criteria have been changed, and this can cause UE 650B to read broadcasted information including the changes, e.g., included in a SIB as described above.

In one or more embodiments, UEs 650A-B can have a priori knowledge about a scheduling window for the SIB from other broadcast information or, alternatively, as part of an RRC configuration, e.g., UE 650A can have scheduling information corresponding to times when updated criteria 695A-B can be included in a SIB with broadcast criteria 695A-B. In some circumstances, having this scheduling window can advantageously reduce the workload of UEs 650A-B by reducing the frequency of checking for updated criteria.

FIG. 7 illustrates a flow diagram of an example method 700 that can facilitate centrally assisted associations with a local manager by peers in a peer to peer wireless system, in accordance with one or more embodiments. For purposes of brevity, description of like elements and/or processes employed in other embodiments is omitted.

At 702, example method 700 can select (e.g., by association parameter selector 130), by network device 510 comprising processor 160, association parameter 580 that can provide criterion 590A for associating UE 510 with a group of user equipments (e.g., UEs 550A-B).

At 704, example method 700 can communicate, by network device 410, to UE 550A, criterion 590A, enabling the UE 550A to select local manager 555 from a group of candidate local managers of the group of user equipments (e.g., UEs 550A-B), based on the criterion 590A.

FIG. 8 illustrates a flow diagram of an example method 800 that can facilitate providing feedback to improve the centrally assisted associations of FIG. 7. For purposes of brevity, description of like elements and/or processes employed in other embodiments is omitted.

At 802, example method 800 can select (e.g., by association parameter selector 130), by network device 510 comprising a processor 160, association parameter 580 that can provide criterion 590A for associating UE 510 with a group of user equipments (e.g., UEs 550A-B).

At 804, example method 800 can communicate, by network device 510, to UE 550A, criterion 590A, enabling the UE 550A to select local manager 555 from a group of candidate local managers of the group of user equipments (e.g., UEs 550A-B), based on the criterion 590A.

At 806, example method 800 can update, by the network device, association parameter 580 based on an aggregated cost metric (e.g., criteria 590C) received from local manager 555.

Figure 9:
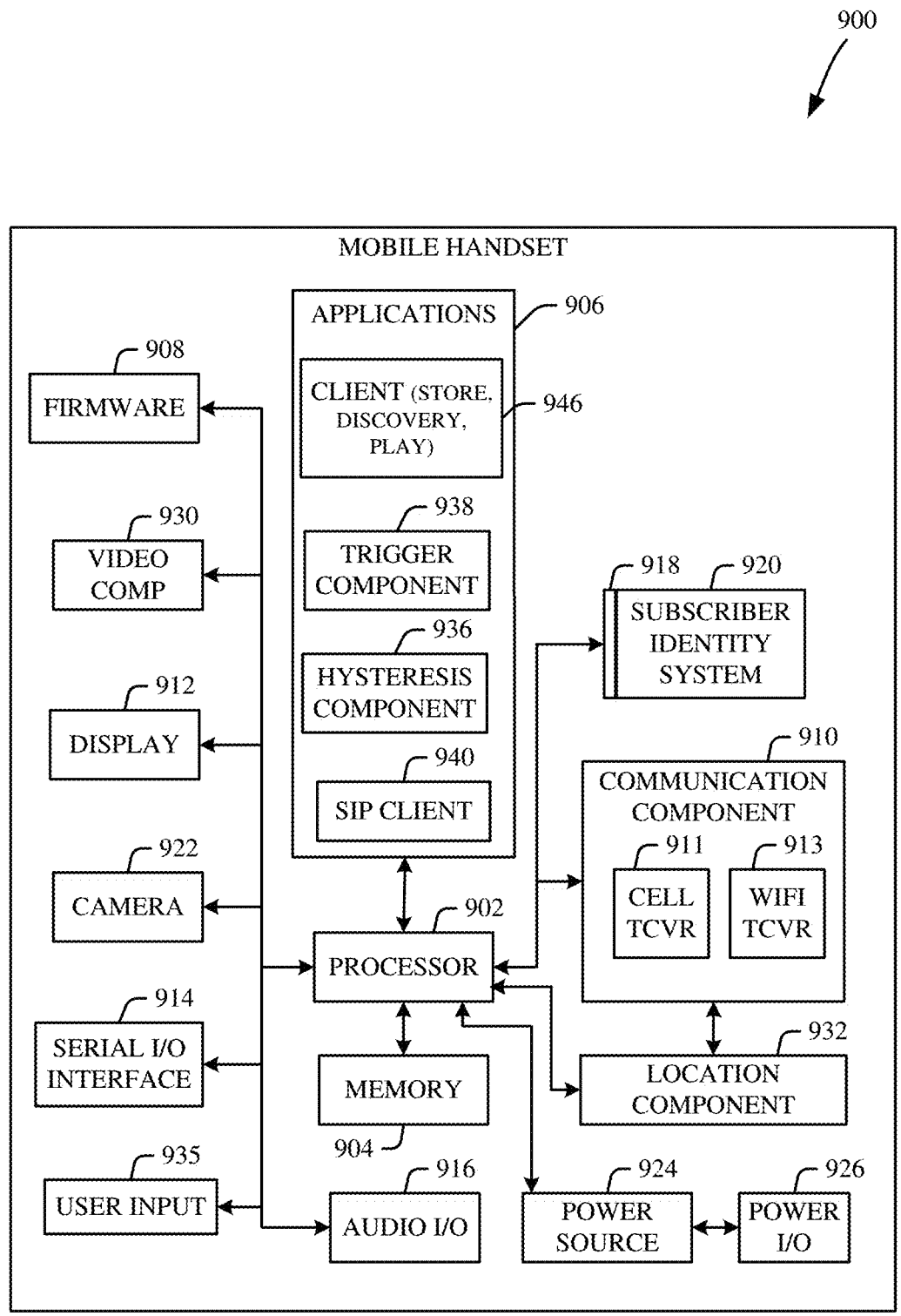
FIG. 9 illustrates an example block diagram of an example mobile handset operable to engage in a system architecture that can facilitate processes described herein, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As can be seen, the technology described herein can provide increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology can facilitate reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

In example implementations, user equipments are able to send and/or receive communication data via a wireless link to the network device. Wireless communication system 200 can thus include one or more communication service provider networks that facilitate providing wireless communication services to various user equipments via the network device and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of systems described herein are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
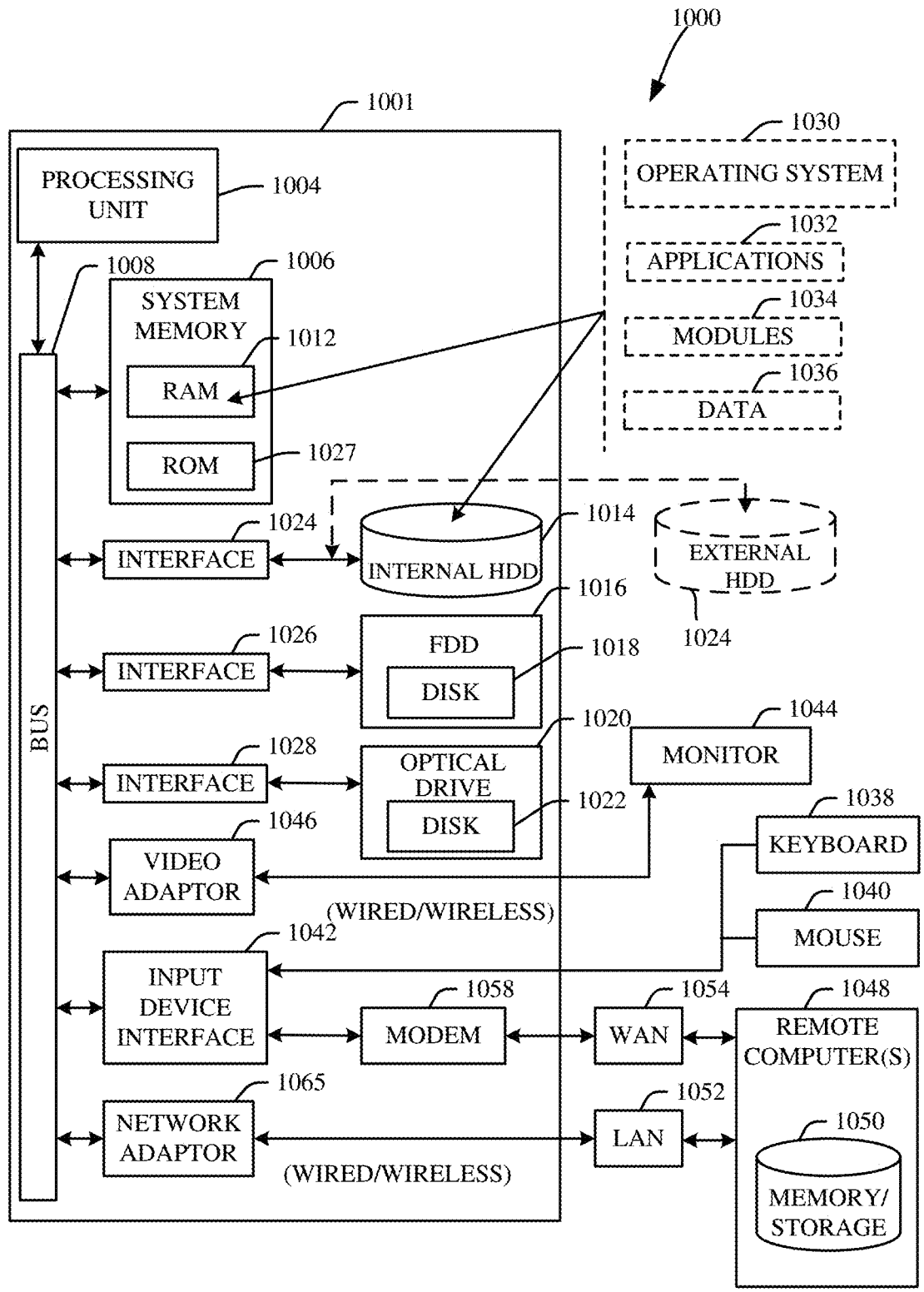
FIG. 10 illustrates an example block diagram of an example computer operable to engage in a system architecture that can facilitate processes described herein, in accordance with one or more embodiments.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of an operating environment 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
for a local group of user equipment of a collection of local groups of user equipment, selecting, by network equipment comprising a processor, an association parameter that provides a criterion for selection of a first user equipment of the local group to be a local manager of the local group of user equipment; and
communicating, by the network equipment, to a second user equipment in the local group, the association parameter, enabling the second user equipment to:
based on the association parameter and a weighting factor comprised in the association parameter, generate the criterion, and
based on the criterion, select the first user equipment as the local manager from a group of candidate local managers of the local group, wherein the local manager performs group management functions for the local group.

2. The method of claim 1, wherein the criterion generated by the second user equipment comprises an aggregated cost metric generated based on the association parameter and a network metric, and wherein enabling the second user equipment to select the local manager based on the criterion comprises enabling the second user equipment to select the local manager based on the aggregated cost metric.

3. The method of claim 2, wherein the network metric comprises a value corresponding to a workload of the local manager.

4. The method of claim 2, further comprising, updating, by the network equipment, the association parameter based on the aggregated cost metric.

5. The method of claim 1, wherein the association parameter comprises an approach to selecting the local manager that depends upon a network metric.

6. The method of claim 5, wherein the local manager is further enabled to communicate the network metric to the second user equipment, enabling the second user equipment to select the local manager based on the approach and the network metric.

7. The method of claim 1, wherein communicating the association parameter to the second user equipment comprises communicating the association parameter to the local manager, enabling the local manager to select a network metric to communicate to the second user equipment, and wherein enabling the second user equipment to select the local manager based on the criterion comprises enabling the second user equipment to select the local manager based on an approach selected by the second user equipment and the network metric.

8. The method of claim 1, wherein communicating the weighting factor for the approach to selecting the local manager comprises communicating the association parameter to the local manager, enabling the local manager to select the weighting factor and communicate the weighting factor to the second user equipment.

9. A system, comprising:
a processor; and
a memory that stores executable instructions that, when executed by the processor, facilitate performance of operations, comprising:

identifying a group of candidate local managers of a local group of user equipment of a collection of local groups of user equipment, receiving, from a network device, an association parameter selected by the network device and a weighting factor comprised in the association parameter, based on the association parameter, generating a criterion for selecting a local manager of the group of candidate local managers, and based on the criterion, selecting the local manager.

10. The system of claim 9, wherein the criterion comprises an aggregated cost metric generated based on the association parameter and a network metric, and wherein selecting the local manager based on the criterion comprises selecting the local manager further based on the aggregated cost metric.

11. The system of claim 9, wherein the operations further comprise receiving a control channel message comprising a notification that an updated criterion is available from a broadcasted signal.

12. The system of claim 11, wherein the control channel message comprises a paging message and the broadcasted signal comprises a system information block.

13. The system of claim 11, wherein the broadcasted signal is broadcast by the local manager, and wherein the broadcasted signal is based on the association parameter.

14. The system of claim 11, wherein the broadcasted signal is broadcast by the network device.

15. A non-transitory machine-readable medium, comprising executable instructions that, when executed by a processor of a network device, facilitate performance of operations, comprising:

for a local group of user equipment of a collection of local groups of user equipment, selecting an association parameter, and communicating to a second user equipment, the association parameter and a weighting factor comprised in the association parameter, enabling the second user equipment to:

based on the association parameter, generate a criterion for selecting a first user equipment of the local group to be a local manager of the local group, and based on the criterion, select the local manager from a group of candidate local managers of the local group, wherein the local manager performs group management functions for the local group.

16. The non-transitory machine-readable medium of claim 15, wherein the criterion generated by the second user equipment comprises an aggregated cost metric generated based on the association parameter and a network metric, and wherein enabling the second user equipment to select the local manager based on the criterion comprises enabling the second user equipment to select the local manager further based on the aggregated cost metric.

17. The non-transitory machine-readable medium of claim 16, wherein the operations further comprise, updating the association parameter based on the aggregated cost metric.

18. The non-transitory machine-readable medium of claim 15, wherein communicating the weighting factor for the approach to selecting the local manager comprises communicating the association parameter to the local manager, enabling the local manager to select the weighting factor and communicate the weighting factor to the second user equipment.

19. The non-transitory machine-readable medium of claim 15, wherein the association parameter further comprises an approach to selecting the local manager that depends upon a network metric, wherein the network metric comprises a value corresponding to a workload of the local manager.

20. The non-transitory machine-readable medium of claim 19, wherein the local manager is further enabled to communicate the network metric to the second user equipment, enabling the second user equipment to select the local manager based on the approach and the network metric.

* * * * *